May 25, 1965    C. NIGGELOH    3,185,054
CAMERA FOR PHOTOGRAPHIC FILM
Filed Nov. 24, 1959    4 Sheets-Sheet 1
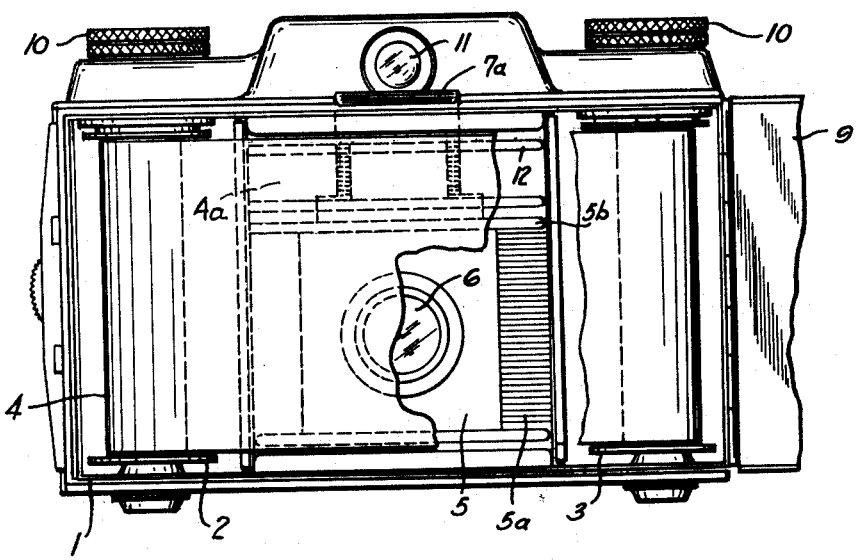
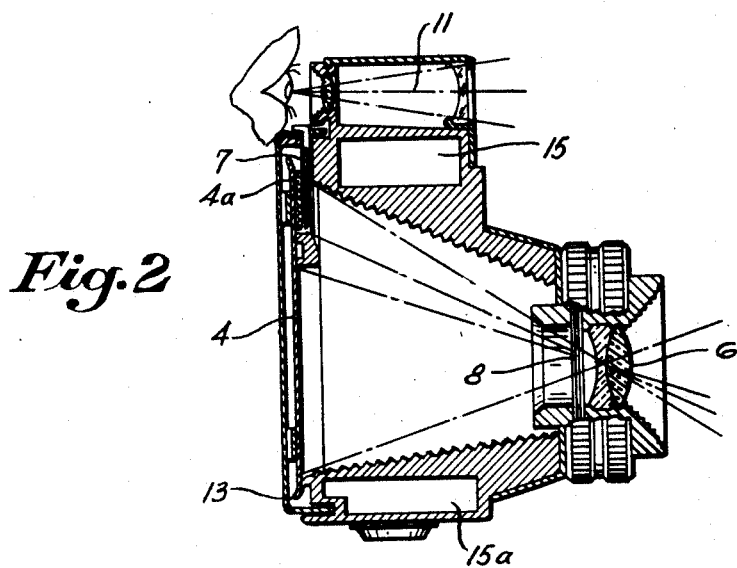
INVENTOR.
Curt Niggeloh
BY Richards & Geier
ATTORNEYS May 25, 1965  C. NIGGELOH  3,185,054
CAMERA FOR PHOTOGRAPHIC FILM
Filed Nov. 24, 1959  4 Sheets-Sheet 3
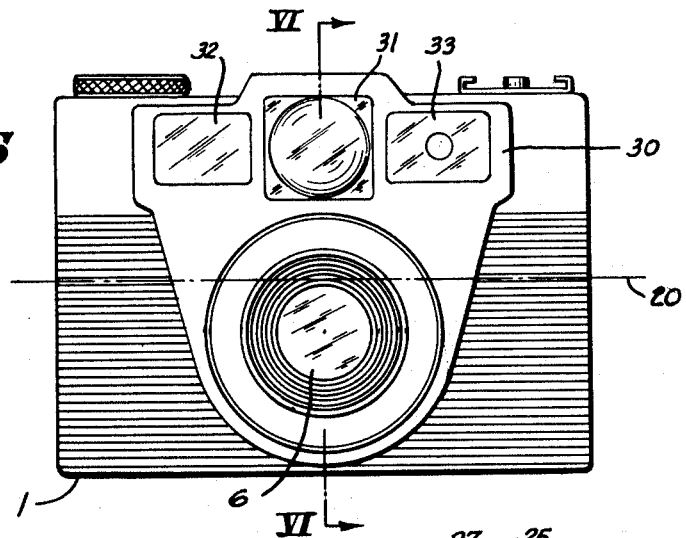
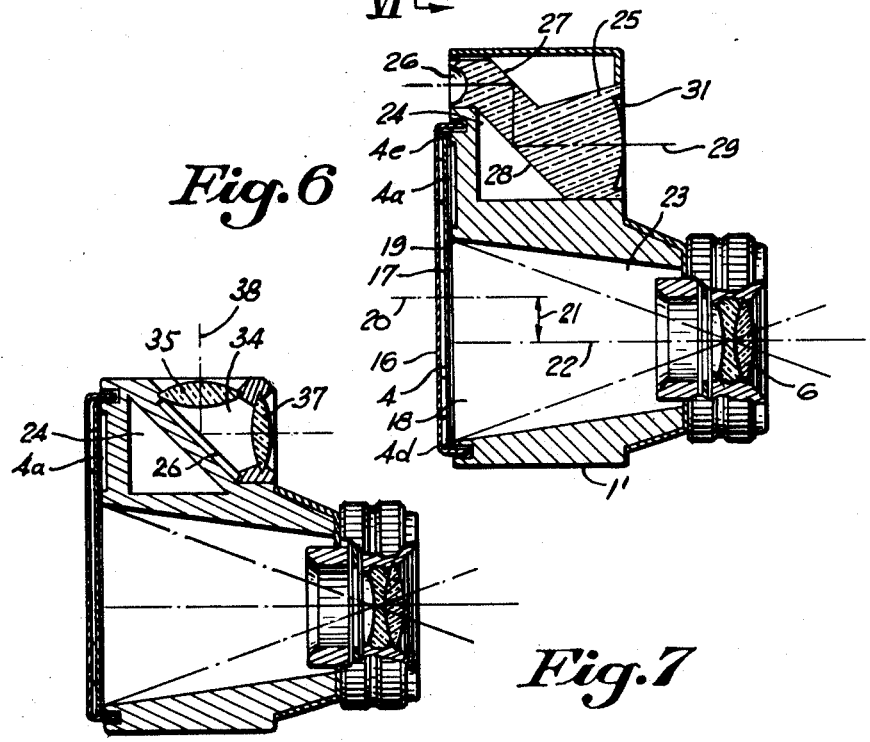
INVENTOR.
Curt Niggeloh
BY Richards & Geier
ATTORNEYS May 25, 1965  C. NIGGELOH  3,185,054
CAMERA FOR PHOTOGRAPHIC FILM
Filed Nov. 24, 1959  4 Sheets-Sheet 4

INVENTOR.
Curt Niggeloh
BY Richards & Geier
ATTORNEYS 3,185,054
CAMERA FOR PHOTOGRAPHIC FILM
Curt Niggeloh, Kaiserstrasse, Fichtenhof, Radevormwald, Rhineland, Germany
Filed Nov. 24, 1959, Ser. No. 855,080
Claims priority, application Germany, Nov. 26, 1958,
A 30,818; Dec. 10, 1958, K 36,436
13 Claims. (Cl. 95—11)

This invention relates to a camera for a photographic roll film.

In existing cameras, the objective is located centrally upon the camera casing and the constructions have the purpose of arranging the location of the photograph frames so as to utilize the photographic film area to the largest possible extent. Consequently, in prior art, the film is so divided into individual picture frames that approximately the entire available surface of the film is utilized for the pictures, or the picture frames are located symmetrically to the middle of the frame.

An object of the present invention is to improve the constructions of cameras for photographic roll film.

Other objects will become apparent in the course of the following specification.

The present invention pertains to a camera for a photographic roll film for producing pictures, the width of which in the direction transverse to the direction of the film is smaller than the available width of the film. As compared to prior art cameras, the present invention pertains to a construction wherein the portion of the film which is exposed is located adjacent one edge of the film, while the remaining film portion which is not exposed through the objective of the camera is used for various marking purposes by means of light- or pressure-actuated means and/or for engagement with a switching device used to move the film stepwise. According to the present invention, the portion of the film which is not used for photographing purposes can be provided with a recess or opening for light rays directed to a finder. The edge of the film projecting into the path of light rays directed to the finder may be provided with markings or indicia which will facilitate the correct movement of the film in its longitudinal direction through the camera.

An important advantage of the construction of the camera in accordance with the present invention, is that the size of the camera, particularly the height of the camera casing, can be reduced to a substantial extent. Furthermore, the necessity of having a window for numerals in the rear cover of the camera within the range of the image exposed through the objective, is eliminated.

According to an embodiment of the invention, the film portion which is not utilized for photographing, in addition to the recesses, can be also provided with notches for engagement with a locking lever. These notches thus serve for indicating the correct position of the picture frame which is to be exposed. It is also possible to provide a stepwise operating shifting device, which in conjunction with the double light lock known in the art, permits the stepwise shifting of the film to the extent of a single picture frame.

In accordance with the present invention based on the photographic camera of the described type, the objective or the exposure device is located eccentrically to the longitudinal middle line of the film. The picture area extends from one edge of the film up to a portion located beyond the longitudinal middle line of the film. The space located opposite the unexposed film portion from the end of the picture frame to the adjacent edge, is utilized according to the invention at least in part for various devices constituting a part of a camera, such as a finder.

Advantageously, the camera of the present invention can be used for a roll film known as "B 2–8" which has sixteen picture frames, each having the size 4 x 4 cm. Obviously, films of a different size can be used as well, for example, films having pictures of the size 4 x 6.5 cm. or small size picture frames, the longer side of which extends transversely to the direction of the film and which measure 24 x 36 mm. However, it was found that particular advantages are attained with the size of 4 x 4 cm. A special roll film for pictures of this size is presently available, but the winding core of the spool of this film is so small that the film is often subjected to torsion and it is not possible to maintain the picture frame surfaces precisely in the required plane. These drawbacks of the described known camera are eliminated by the present invention.

A camera constructed in accordance with the present invention constitutes a handy apparatus of the type of small cameras which may be of an even smaller size and which makes it possible for the user of the B 2–8 film to enjoy all the advantages of small size photography or of the film size providing pictures having the size of 4 x 4 cm. A particular advantage of the camera of the present invention, is that it can be combined with all devices and auxiliary means which are at the disposal of the photographer using small size photography, such devices and means being available in large selections and at reasonable costs. By dispensing with the use of the full width of the film material for photographing purposes, the user of the camera has a substantial commercial advantage in that the large B 2–8 film is available for the same price as the smaller A 8 film, and it is possible to take sixteen photographs of the size 4 x 4 cm. instead of twelve. However, the subject of the present invention is not limited to the use of a B 2–8 film. Similar advantages can be attained, for example, by the use of the 35 mm. cinematographic film which is perforated for the size 16 x 16 mm. and is not perforated for the size 24 x 24 mm. In all these instances, a substantial additional space is provided in the camera casing with little effort and the construction of the camera itself is rendered much more convenient.

A further advantage of the present invention consists in that in the development and registering of negatives, the wide edge of the film which has not been exposed, can be used for receiving markings, perforations, or the like, whereby it is possible to use markings identifying a camera or a progressing series of numerals. The constructor of a camera can use the space located in front of the non-exposed sensitive layer portion of the film for the provision of various parts or devices which constitute a part of or may be combined with a camera. By way of example, this space can contain in addition to the finder, an exposure meter, a range finder, a film marking device, a device for progressively moving the film through the camera or the like, all without increasing the total height of the camera to any substantial extent. The camera of the present invention can be manufactured most inexpensively through the elimination of technical means required in existing cameras for the location of the picture frames, such as switchable objectives, pluralities of objectives, insertable shutters, means for re-winding or repeatedly moving the film and the like.

According to one embodiment of the inventive idea, the light rays extending to the finder are bent in at least once into the space within the camera casing which is located in front of the unexposed portion of the film. This is particularly advantageous when a "brilliant" finder is used since it can be placed either in its entirety or practically in its entirety in the above mentioned space within the camera.

The present invention also pertains to a particularly advantageous and space saving finder construction wherein the peep sight for the finder is located close to the adjacent edge of the film and the light rays extending to the finder are bent twice and are directed to the objective from the adjacent edge of the film. It is true that in this construction, the total height of the camera casing and the dimensions of the peep sight of the finder are larger than when the brilliant finder is used. On the other hand, such construction has the advantage that the picture can be seen more conveniently than when the user looks at it from above. This is particularly advantageous when photographing various sport events. Obviously, the peep sight does not have to be placed exactly parallel to the axis of the objective. It is possible to arrange it at a slight inclination to the objective axis and then the total height of the camera casing will be somewhat diminished.

Furthermore, in accordance with another embodiment of the present invention, a prism bar is used which has at least two reflecting surfaces and which is preferably made of clear glass-like plastic material. This bar extends across the entire width of the camera casing. However, the reflecting mirror-like surfaces can be replaced by individual prisms used for guiding the light rays.

The invention will appear more clearly from the following detailed description when taken in connection with the accompanying drawings, showing by way of example only, preferred embodiments of the inventive idea.

In the drawings:

FIG. 1 is a rear view of a photographic roll film camera constructed in accordance with the principles of the present invention, the cover being open and a light marking device being located between the finder and the picture area.

FIG. 2 is a transverse section through the camera shown in FIG. 1.

FIG. 5 is a front view of a somewhat differently constructed camera of the present invention and illustrates the utilization of the space which is made available within the camera.

FIG. 6 is a transverse section along the line VI—VI of FIG. 5, and illustrates the bending of the light rays directed to the finder.

FIG. 7 is a section through a somewhat differently constructed camera provided with a brilliant finder.

Throughout the following specification, the same or similar parts are indicated by the same numerals.

Figure 3:
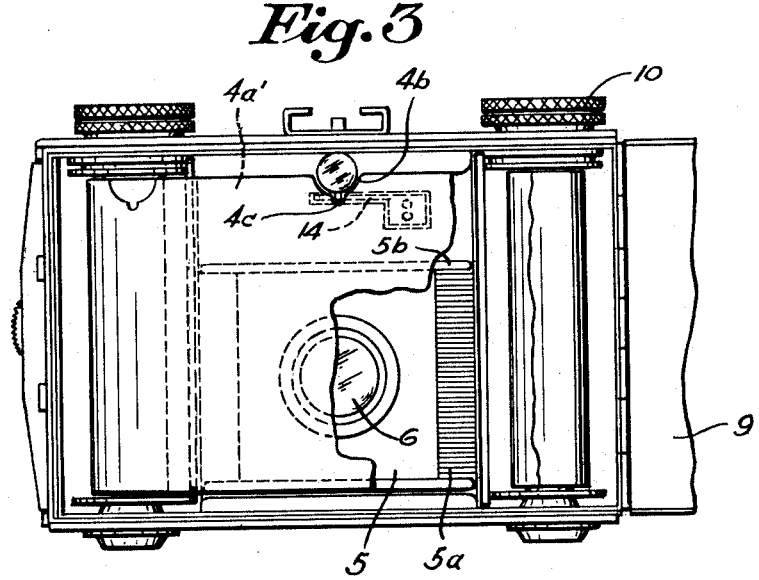
FIG. 3 is a rear view of a somewhat differently constructed camera with the rear cover being open and the finder being located within the confines of the film surface.

The camera shown in FIGS. 1 and 2 has a casing 1 carrying the two spools 2 and 3 for the roll film 4. As shown in FIG. 1, the roll film 4 and its supporting layer of paper are considerably wider than the height of the picture frame 5. The illustrated example shows a B 2-8 roll film wherein the film is 60 mm. wide. However, by way of example, the picture area is a square having the width and the height of only 40 mm. each.

According to the present invention, the portion 4a of the film which is not utilized for exposure and picture taking, is used for marking purposes. As illustrated in FIG. 2, the light rays passing through the objective 6 will illuminate a marking plate 7 located over the portion 4a of the film as soon as the objective is open by actuating the usual device 8. The marking plate 7 may be provided with suitable openings through which the light reaches the film portion 4a so as to inscribe the desired indicia. The plate 7 is provided with an upper portion 7a through which it can be conveniently inserted and withdrawn when desired. The camera has a rear cover 9, knobs 10 for actuating the film and a finder 11, which in the example illustrated, is of the so-called "Galilei" type. The film supporting surfaces which extend around the picture frame portion 5 are designated as 5a and 5b in the drawing. The portion of the film 4 which is not used for picture exposure is located between two guide rails 12 which jointly with the pressing plate 13 of the camera, form a light-tight closure between that space of the camera wherein the exposure takes place and the space used for marking purposes. As already stated, the marking plate 7, which is provided with a handle portion 7a and which is mounted between two plush guides in the camera casing, can be provided with all types of different insignia, for example, the name of the owner of the camera or the date of photographing. Furthermore, the diaphragm opening and the exposure time used for taking a particular picture can be noted upon the edge portion of the film. The marking can be carried out in a known manner either by the use of light marking or pressure marking.

When pressure marking is used, the plate 7, 7a is replaced by a cover slide located upon the rear side of the camera cover. When the slide is removed, an opening is exposed which is covered by a red window for protection against light exposure and then through the use of a writing point or the like, the required notations may be impressed upon the edge portion of the film. After developing, these notations can be read easily.

There is also the possibility that an operator who is in charge of the development of the film and the making of prints, will apply his own markings upon the edge portion by the use of perforating pliers or by the application of a specific indicating slip. The treatment and the finding of the original film, particularly in large developing and printing establishments, is thus greatly facilitated.

Figure 4:
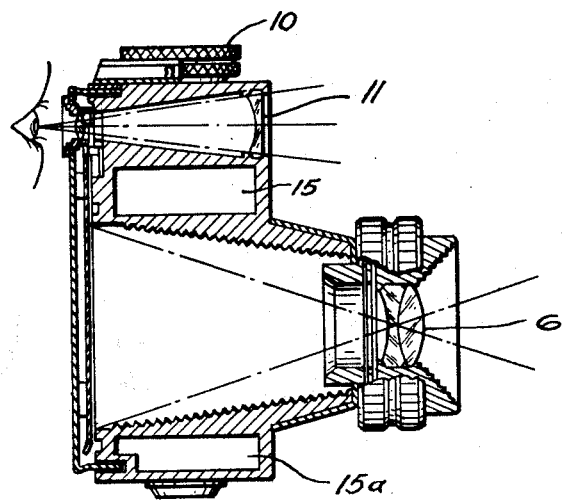
FIG. 4 is a section through the camera shown in FIG. 3.

Another embodiment of the present invention is illustrated in FIGS. 3 and 4. In this construction, the roll film 4a′ and possibly its supporting paper strip have a recess 4b, which may be an opening or the like, and a notch 4c located upon that edge portion of the film which is not used for exposure. The provision of the opening 4b in the film makes it possible to arrange the Galilei finder 11 considerably closer to the objective 6 than was the case in prior art constructions, so that the height of the camera is reduced. Furthermore, the provision of the opening 4b in the film makes possible a very precise setting of the picture frame of the film, since the user will not be able to see through the finder until the film recess 4b is located precisely in alinement with the peep sight of the finder. It is also possible to indicate the correct movement of the film to the precise location of the following picture frame through the provision of the notch 4c in the upper unexposed film portion 4a, through the provision of a stop lever 14 which will engage the notch 4c in the correct position of the film. The casing of the photographic camera contains spaces 15 and 15a which can be conveniently used for storing or location of camera accessories of any desired type, for example, tape measure, exposure meter, range finder or the like.

FIGS. 5 and 6 illustrate a somewhat different camera having a camera casing 1′ provided with a hinged rear cover 16 with a film pressure plate 17. In the illustrated position, the plate 17 presses the film guided between two spools (not shown) against the edge of the picture window 18. At the sides, the film is properly guided over edge guides in the camera casing. The guides have not been shown in the drawing for the sake of clarity of illustration. The film 4 has a lower edge 4d and an upper edge 4e. The picture window has an upper edge 19 which divides the film into a lower film portion which is exposed and used for photography, and an upper film portion 4a. Thus, the center 20 of the film is shifted by the length 21 relatively to the optical axis 22 of the objective.

Due to this arrangement, a space 24 is provided in the casing of the camera above the light rays 23 used for exposure, and in front of the film strip 4a. This space 24 can be used for placing different structural elements or auxiliary devices of the camera.

By way of example, the space 24 can be used for receiving devices serving for a stepwise movement of the film through the camera.

However, according to the embodiment shown in FIG. 6, this space 24 contains a cambered prismatic rod 25. The peep sight 26 of the finder which is made comparatively small, is located close to the upper edge 4e of the film. Two parallel surfaces 27 and 28 of the cambered rod are made mirror-like or reflecting so that a light ray 29 directed toward the finder is bent twice and has two portions extending parallel to the optical axis 22 at the time it enters the rod 25 and when it leaves the rod. Preferably, the prismatic rod or bar is made of clear glass-like plastic material.

It is apparent that the peep sight 26 of the finder does not have to extend necessarily parallel to the rear wall of the camera, but can be inclined in relation thereto, thereby further diminishing the height of the camera.

Instead of using mirror surfaces 27 and 28, the light rays passing through the finder can be bent by means of individual prisms.

The front side of the camera carries a plate 30 which contains the finder window 31 and in addition thereto, two windows 32 and 33 for the range finder, the exposure meter or the like. It is apparent that the space 24 located in front of the film strip 4a is so large that even when the prismatic bar 25 is used, it is possible to guide light rays directed toward a range finder or to provide mechanical film actuating devices transversely to the central finder window.

FIG. 7 illustrates an embodiment of the invention wherein the height of the camera has been made exceptionally small by the use of a brilliant finder 34 having a viewing lens 35, a reflex mirror 36 and an outer lens 37 receiving the light rays. The axis 38 of the finder is bent from a vertical to a horizontal direction. Then the camera casing can end quite closely to the upper edge of the film portion 4a or to the upper end of the film spools, and the finder can be built-in substantially entirely in the inner space of the camera casing which is located in front of the unexposed film strip portion 4a.

The constructions shown in FIGS. 6 and 7 can be further changed by providing a second objective, thereby forming a two-view reflex mirror camera.

According to the illustrated embodiment, a non-perforated B 2–8 roll film can be used, by way of example, which is divided into individual picture frames of 4 x 4 cm. The camera cover has two windows (not shown) through which numerals indicating the pictures can be seen. If the direction of movement is reversed, it is possible to place these windows within the outlines of the film strip portion 4a. This last arrangement has the advantage that the important portion of the film which is used for exposure, is not subjected to the danger of damage by light through the viewing windows. Furthermore, it is not necessary in that case to use glass for these windows with very strong light filters, as is necessary nowadays whenever the newest highly sensitive films are used.

Figure 8:
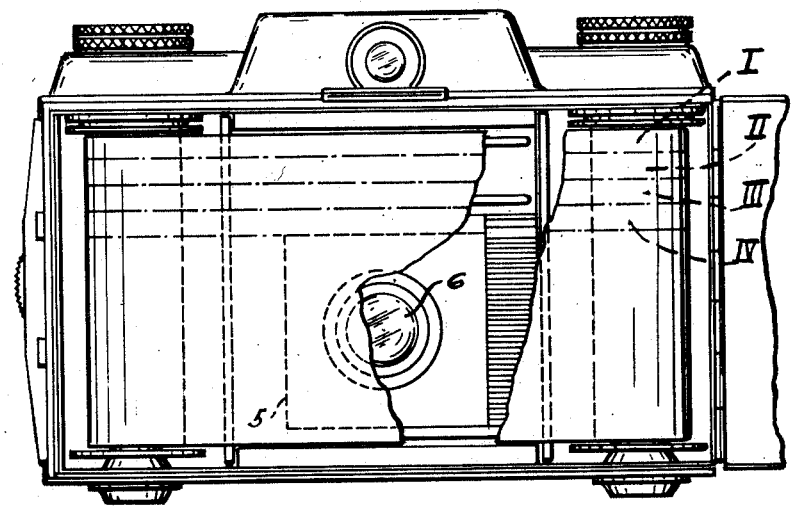
FIG. 8 is similar to FIG. 1 and illustrates diagrammatically the preferable utilization of the space available adjacent the unexposed film portion.

FIG. 8 which is similar to FIG. 1, illustrates diagrammatically the manner in which the space available within the camera in accordance with the present invention, can be used for a variety of different purposes. As shown in FIG. 8, this space is divided into sections I, II, III, and IV. Thus, the non-exposed available edge portion of the film can be sub-divided in a plurality of superposed portions or layers. The portion I may be used for the passage of light rays toward the finder. The space II can be used for markings, perforations and the like. The space III may be used for engagement with a device moving the film stepwise, while the space IV is usable for a film marking device.

The term "picture-defining device" as used in the claims, is intended to describe auxiliary equipment carried by the camera and now in general use, such as a marking device used for defining or identifying an exposed picture, or a view finder or film actuator used for defining the outlines of the picture to be photographed. As has been described above, these devices are located at least partly in alinement with the unexposed portions I to IV of the film.

It is apparent that the examples illustrated above have been given solely by way of illustration and not by way of limitation, and that they are subject to many variations and modifications within the scope of the present invention. All such variations and modifications are to be included within the scope of the present invention.

What is claimed is:

1. A camera for a photographic film, which comprises a casing, means supporting a film for movement within said casing and a single objective carried by said casing for exposing a picture area of said film, said objective having a central longitudinal axis and said film having a longitudinal middle line, said camera being characterized in that the central longitudinal axis of said objective is located to the side of the longitudinal middle line of the film, whereby only a part of the width of the film is exposed during photographing and whereby another portion of said film remains unexposed during photographing, and a picture-defining device within said casing, at least a portion of said device being located in alinement with the unexposed portion of said film, the single objective and the picture defining device being arranged transversely to the direction of movement of the film.

2. A camera in accordance with claim 1, wherein said device consists of means for marking the unexposed portion of said film.

3. A camera in accordance with claim 1, wherein said device comprises a finder located within said casing adjacent to the unexposed portion of said film.

4. A camera in accordance with claim 1, wherein said device comprises a film-actuating device located within said casing and engaging the unexposed portion of said film.

5. A camera in accordance with claim 3, wherein the unexposed portion of said film has spaced recesses corresponding to the number of picture areas of said film, each of said recesses being located in front of said finder to permit viewing of the picture to be exposed only when an unexposed picture area of the film is located in the exposure position within said casing.

6. A camera in accordance with claim 4, wherein the unexposed portion of said film has spaced recesses corresponding to the number of picture areas of said film, said film-actuating devices comprising a lever located in said casing and selectively engaging each of said recesses for locking the film in a position in which an unexposed picture area of the film is located in the exposure position within said casing.

7. A camera in accordance with claim 3, wherein a space is formed in said casing in front of the unexposed portion of said film, and wherein said picture-defining device comprises means receiving light rays of the picture to be exposed and bending said light rays into said space while transmitting them to said finder.

8. A camera in accordance with claim 3, wherein said finder is a brilliant finder, and wherein a space is formed in said casing in front of the unexposed portion of said film, said brillant finder being located substantially within said space.

9. A camera in accordance with claim 3, wherein said finder is located close to an edge of the unexposed film portion, and wherein said picture-defining device comprises means receiving light rays of the picture to be exposed and bending said light rays twice while transmitting them in front of said exposed film portion to said finder.

10. A camera in accordance with claim 9, wherein the last-mentioned means comprise a prism bar having two reflecting surfaces for receiving light rays of said picture and bending said light rays twice while transmitting them in front of said unexposed film portion to said finder viewer.

11. A camera in accordance with claim 10, wherein the body of said prism bar consists of transparent plastic material.

12. A camera for a photographic film, said camera comprising a casing, means supporting a film within said casing, an objective carried by said casing for exposing said film, said objective being smaller than the width of the film, whereby only a part of the width of the film is exposd during photographing and whereby another part of said film remains unexposed during photographing, a finder viewer carried by said casing for viewing the picture to be exposed upon the film, means carried by said casing for receiving light rays of said picture, and means located within said casing for transmitting said light rays to said finder viewer while directing said light rays over the unexposed part of said film.

13. A camera for a photographic film, said camera comprising in combination, a casing, means supporting a film within said casing, a single objective carried by said casing for exposing a picture area of said film, said objective being smaller than the width of the film, the central longitudinal axis of said objective being located to the side of the longitudinal middle line of the film, whereby only a part of the film is exposed during photographing and whereby another part of said film remains unexposed during photographing, and a marking plate extending through a slot formed in said casing and covering a portion of said unexposed part of the film, said marking plate having an upper portion extending out of said casing for the insertion and removal of the plate, said marking plate having openings corresponding to indica to be inscribed by light passing through said openings during photographing upon said unexposed part of the film.

References Cited in the file of this patent

UNITED STATES PATENTS

| | | |
|---|---|---|
| 385,513 | Harkness | July 3, 1888 |
| 1,342,155 | Boyce | June 1, 1920 |
| 1,359,245 | Gaisman | Nov. 16, 1920 |
| 1,413,253 | Brown | Apr. 18, 1922 |
| 1,490,487 | Schmidt | Apr. 15, 1924 |
| 2,273,876 | Lutz | Feb. 24, 1942 |
| 2,506,764 | Bach | May 9, 1950 |

FOREIGN PATENTS

| | | |
|---|---|---|
| 537,641 | Canada | Feb. 26, 1957 |
| 853,097 | Germany | July 8, 1949 |